United States Patent
Ramabadran et al.

(10) Patent No.: US 11,388,079 B1
(45) Date of Patent: Jul. 12, 2022

(54) TESTING FORWARDING STATES OF NETWORK DEVICES

(71) Applicant: Amazon Technologies, Inc., Seattle, WA (US)

(72) Inventors: Srinivasan Ramabadran, Sunnyvale, CA (US); Hardeep Singh, Fremont, CA (US); Shanta Pavan Namburi, Sunnyvale, CA (US); Andrei Tcarevskii, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/577,585

(22) Filed: Sep. 20, 2019

(51) Int. Cl.
| H04L 43/50 | (2022.01) |
| H04L 43/12 | (2022.01) |
| H04L 49/60 | (2022.01) |
| H04L 69/22 | (2022.01) |
| H04L 9/40  | (2022.01) |
| H04L 41/046 | (2022.01) |

(52) U.S. Cl.
CPC ............ *H04L 43/50* (2013.01); *H04L 41/046* (2013.01); *H04L 43/12* (2013.01); *H04L 49/602* (2013.01); *H04L 63/101* (2013.01); *H04L 69/22* (2013.01)

(58) Field of Classification Search
CPC ....... H04L 43/50; H04L 41/046; H04L 43/12; H04L 49/602; H04L 63/101; H04L 69/22
See application file for complete search history.

(56) References Cited

U.S. PATENT DOCUMENTS

| 7,519,004 | B1* | 4/2009 | Kamity | H04L 43/50 370/248 |
| 2004/0210939 | A1* | 10/2004 | Kim | H04N 21/2381 725/110 |
| 2006/0235735 | A1* | 10/2006 | Sagfors | H04W 72/02 370/329 |
| 2008/0019385 | A1* | 1/2008 | Sultan | H04L 12/4654 370/401 |
| 2010/0142398 | A1* | 6/2010 | Arad | H04L 43/106 370/252 |
| 2012/0188891 | A1* | 7/2012 | Valimaa | H04L 43/10 370/252 |
| 2014/0119203 | A1* | 5/2014 | Sundaram | H04L 43/10 370/250 |
| 2014/0328343 | A1* | 11/2014 | Kapadia | H04L 45/741 370/392 |
| 2015/0350056 | A1* | 12/2015 | He | H04L 49/35 370/392 |
| 2015/0381486 | A1* | 12/2015 | Xiao | H04L 43/10 370/237 |

(Continued)

*Primary Examiner* — John A Follansbee
*Assistant Examiner* — Raqiul A Choudhury
(74) *Attorney, Agent, or Firm* — Klarquist Sparkman, LLP (57) ABSTRACT

A monitoring solution allows for testing of forwarding states on network devices. In a particular example, an agent on a router A directs a probe packet to a first neighbor device. The first neighbor device reflects the probe back to the router A. The reflected probe packet undergoes a forwarding state lookup similar to other network traffic and is routed to a second neighbor network device. The second neighbor network device reflects the probe back to router A, which can then intercept the packet and redirect it to an agent on router A for verification whether the lookup was performed correctly.

19 Claims, 8 Drawing Sheets

(56) References Cited

U.S. PATENT DOCUMENTS

| | | | |
|---|---|---|---|
| 2016/0036636 A1* | 2/2016 | Erickson | H04L 41/145 370/248 |
| 2016/0112313 A1* | 4/2016 | Niu | H04L 69/22 370/392 |
| 2016/0352601 A1* | 12/2016 | Zhang | H04L 41/0645 |
| 2017/0257900 A1* | 9/2017 | Qi | H04L 61/6022 |
| 2018/0270141 A1* | 9/2018 | Burbridge | H04L 43/0811 |
| 2019/0116124 A1* | 4/2019 | Pignataro | H04L 67/1004 |
| 2020/0145315 A1* | 5/2020 | Levy | H04L 41/14 |

\* cited by examiner

TESTING FORWARDING STATES OF NETWORK DEVICES

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path routing (ECMP), which is a strategy where next-hop packet forwarding to a destination can occur over multiple best paths. ECMP is per-hop decision limited to a single router, and can be inefficient if routers in the network are not functioning.

Testing of network switches can be problematic. Typically, test probes are sent from a source host device through a network of switches to a destination host device. The probes are effective at testing the paths and links in the network, but not effective at testing forwarding rules of the network devices themselves.

DETAILED DESCRIPTION

Existing active network monitoring tools are effective in detecting general loss that impacts an entire device or interface, but such tools lack coverage of forwarding state on all network devices. This results in difficulty in detection of grey failures and negatively impacts network traffic. While such grey failures are not high in volume, they can lead to blackholing of network traffic for extended periods.

A three-hop monitoring solution allows for testing some or all of a forwarding state on each network device, rather than testing an end-to-end packet path. Kernel routing state on a network device is used as baseline and a probe (e.g., a User Datagram Protocol (UDP) packet) is generated for each route entry so as to exercise the forwarding states of the network device. Probes get intercepted at a peer router and sent back to a source for inspection of a rewritten probe packet, which can then be used to verify if the forwarding instructions programmed in a pipeline are consistent with the baseline view. In a particular example, an agent on a router A allocates a set of downstream interfaces, one per pipeline, for each route. Probe packets are directed to a first neighbor device on selected interfaces. The first neighbor device reflects the probe back to the router A. The reflected probe packet undergoes a forwarding state lookup similar to other network traffic and is routed to a second neighbor network device. The second neighbor network device reflects the probe back to router A, which can then intercept the packet and redirect it to an agent on router A for verification whether the lookup was performed correctly.

Figure 1:
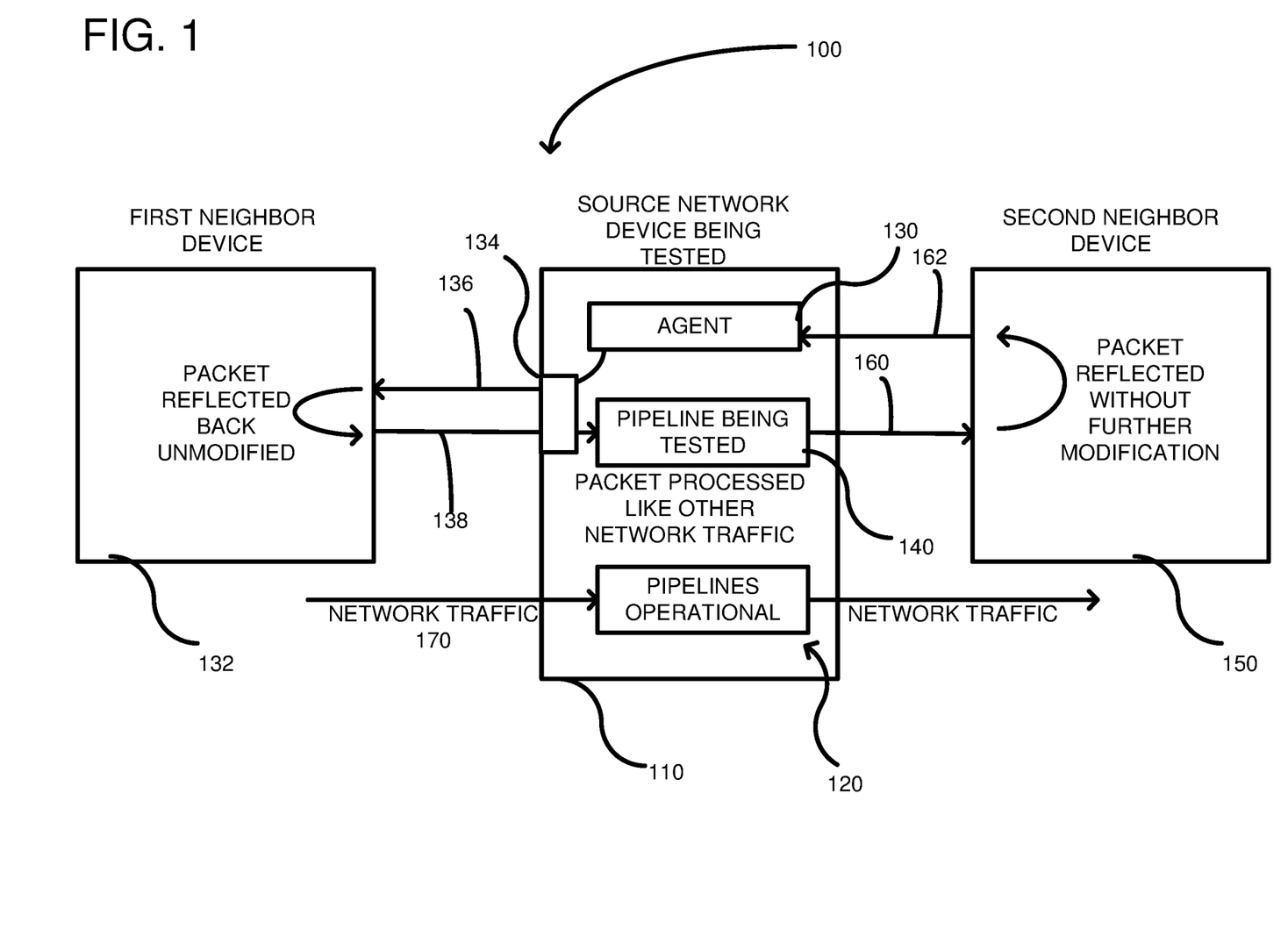
FIG. 1 is a system diagram showing testing of forwarding states on a source network device using multiple neighbor network devices.

FIG. 1 shows a system 100 implementing the three-hop solution for testing forwarding states in a network device. A source network device 110 generates probe network packets that are used to test various pipelines 120 on the source network device 110. In particular, an agent 130 can transmit a probe network packet to a neighbor network device 132 through an interface 134, as shown by arrow 136, to test a pipeline 140. The probe network packet can include a destination IP address that is a faux address to be tested. The neighbor network device 140 reflects the probe network packet back to the source network device 110, as shown by arrow 138, wherein the probe network packet is unmodified. By "unmodified" it is meant that the packet sent at 138 is identical to the packet sent at 136, including a MAC address and a time-to-live (TTL) parameter. The probe network packet is also reflected back to the same interface 134 from which it was received. In this way, the agent can control which interface on the source network device receives the probe network packet. In particular, the agent 130 can select any of a number of other interfaces (not shown) associated with other of the pipelines 120.

Once the probe network packet is reflected back through the interface 134, it is transmitted to the pipeline 140 and treated like normal network traffic. As described further below, the probe network packet can be properly configured so as to pass through the pipeline 140 using layer 2 and layer 3 lookups. As a result of the lookups, the probe network packet can be modified (e.g., an updated MAC address) and transmitted to a second neighbor device 150, as shown by arrow 160. The second neighbor device 150 can detect that the probe network packet is a test packet, and can reflect the probe network packet back to the source network device 110, as shown by arrow 162. The agent 130 can then detect the probe network packet was received and test whether the modifications made to the probe network packet were as anticipated. In some embodiments, the second neighbor device 150 can also perform layer 2 and layer 3 lookups, but reflect the probe network packet back to the source network device 110 without modification from how it was received.

Still further, the testing of the pipeline 140 can occur while normal network traffic 170 (non-test traffic) is being transmitted to and switched by the pipelines 120 of the network switch 110. Additionally, the pipeline 140 can also receive normal network traffic during the testing. Thus, the source network device 110 can remain fully operational so as to switch network traffic intermingled with the test probes. By using the three-hop solution, the pipeline 140 is tested as well as the interfaces coupled to the neighbor devices 132, 150. Moreover, the pipeline 140 performs the test under conditions that simulate network traffic by receiving from one network device and transmitting to another network device using the pipeline 140 under test. It should also be understood that although an agent 130 is shown running on the source network device, a light-weight agent can be used instead that transmits to and takes instructions from a remote server (not shown).

Figure 2:
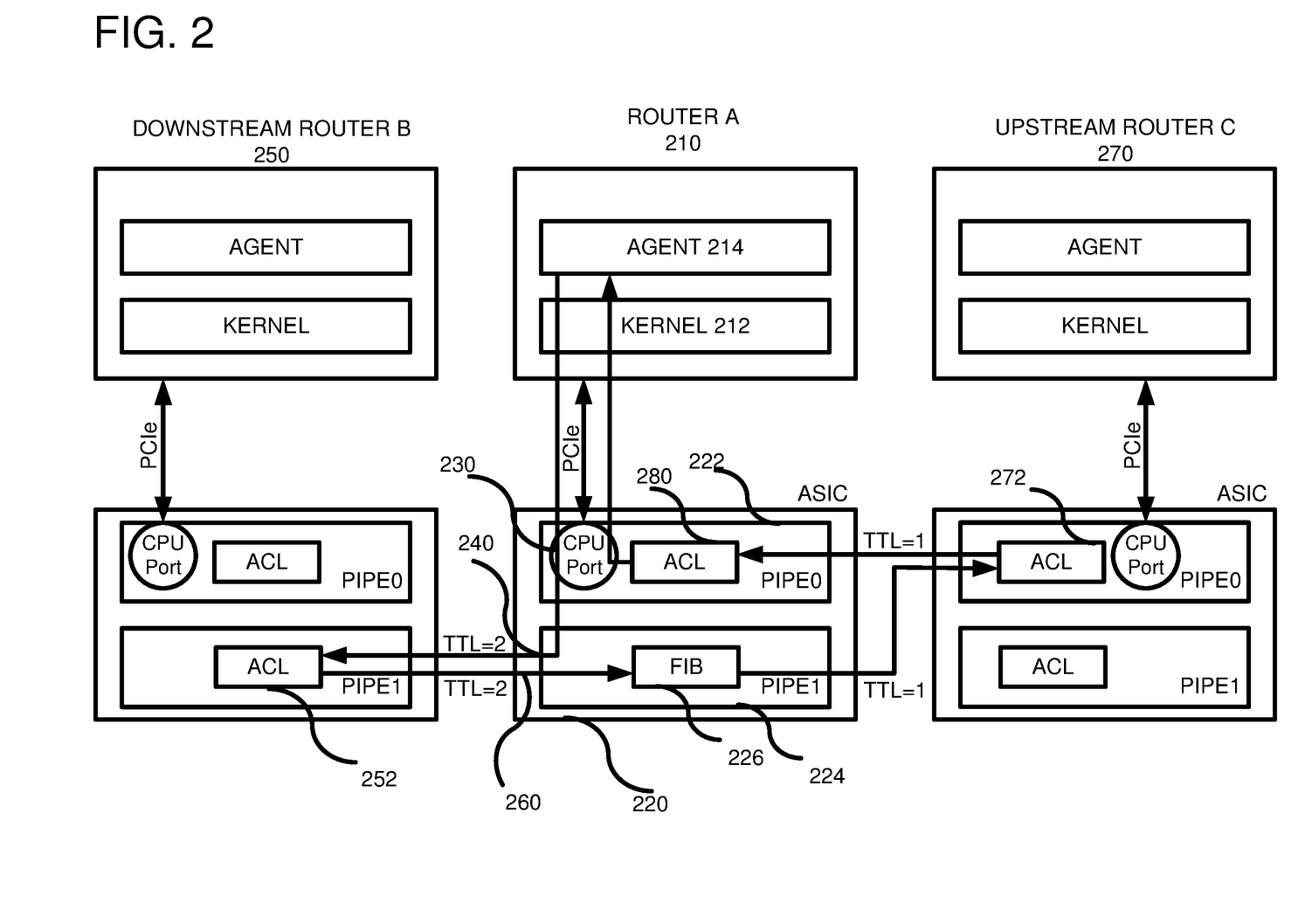
FIG. 2 is a system diagram according to another embodiment for testing of forwarding states on a source network device using multiple neighbor network devices.

FIG. 2 shows another embodiment of a system wherein a three-hop solution is used to test a forwarding table on a network device. A router A 210 includes a kernel 212 and agent 214 running in a control plane of the router. Switching logic 220 of the router A 210 includes multiple pipelines, two of which are shown at 222, 224 as pipeline 0 and pipeline 1, respectively. The pipeline 1 224 includes a FIB 226 being tested. The pipeline 0 222 includes a CPU port 230, which is used by the agent 214 to inject network packets (also called test packets) into the switching logic 220. In particular, the agent 214 uses the CPU port 230 to inject a probe network packet such that it passes via a PCIe bus to the CPU port 230 and through an interface (not shown) associated with pipeline 1 224, as indicated by arrow 240. A TTL parameter is set at 2. Likewise, a MAC address is set such that when the probe network packet is reflected, it appears as normal network traffic to pipeline 1 224.

The probe network packet is received in a downstream neighbor router B 250 on a pipeline 1 having an ACL 252. Because the MAC address is set improperly for proper routing in router B 250, layer 2 and layer 3 lookups are bypassed. As a result, the probe network packet can pass directly to the ACL 252, which can check on various fields of the probe network packet so as to identify the packet as a test packet. Such fields can be in the header of the packet and can include a source address range associated with a source IP address, a UDP port number, etc. If a match is found by the ACL hardware 252, then the packet is reflected back on the same interface upon which it is received. Additionally, the packet is not modified and is returned as it was received.

As shown by arrow 260, the probe is reflected back to the same interface on router A 210 from which it was transmitted, and that interface is coupled to the pipeline 224 under test. In particular, the test packet has correct header information such that it proceeds through layer 2 and layer 3 lookups on pipeline 1 224. For example, the MAC address has a destination MAC that is associated with router A 210. As the probe network packet proceeds through the pipeline 1224, the TTL is reduced to 1 and the MAC address is modified so that the source MAC is router A 210 and the destination MAC is a router C 270. Although not shown, router C 270 can perform layer 2 and layer 3 lookups on the modified probe network packet, but does not further modify the probe network packet. Specifically, an ACL 272 on router C 270 detects that the packet is a test probe using the header information discussed above and reflects the packet back to the router A 210 unmodified.

The router A 210 includes an ACL that can determine that the probe is a test probe using the header information discussed above and redirects the packet to the agent 214 through the CPU port 230. The agent 214 can analyze that the packet was received back from router C 270, as anticipated, and that the packet has the modified header information. Thus, a comparison can be performed comparing the header information, such as the MAC address, UDP ports, TTL, etc., to predetermined information stored in the router A 210. If there is a match, then the test for the forwarding table entry has passed. Each entry in the forwarding table can be similarly tested and, in addition, each pipeline can be tested to ensure full testing of all the forwarding table entries in the switching logic 220. Note that router B 250 and router C 270 have a similar structure to router A 210 and can be source devices for testing their respective pipelines. In some embodiments, if the probe network packet is not received back in a predetermined period of time, the agent 214 can retry transmitting the probe network packet one or more times. If the probe network packet is still not received back, then testing also failed.

Figure 3:
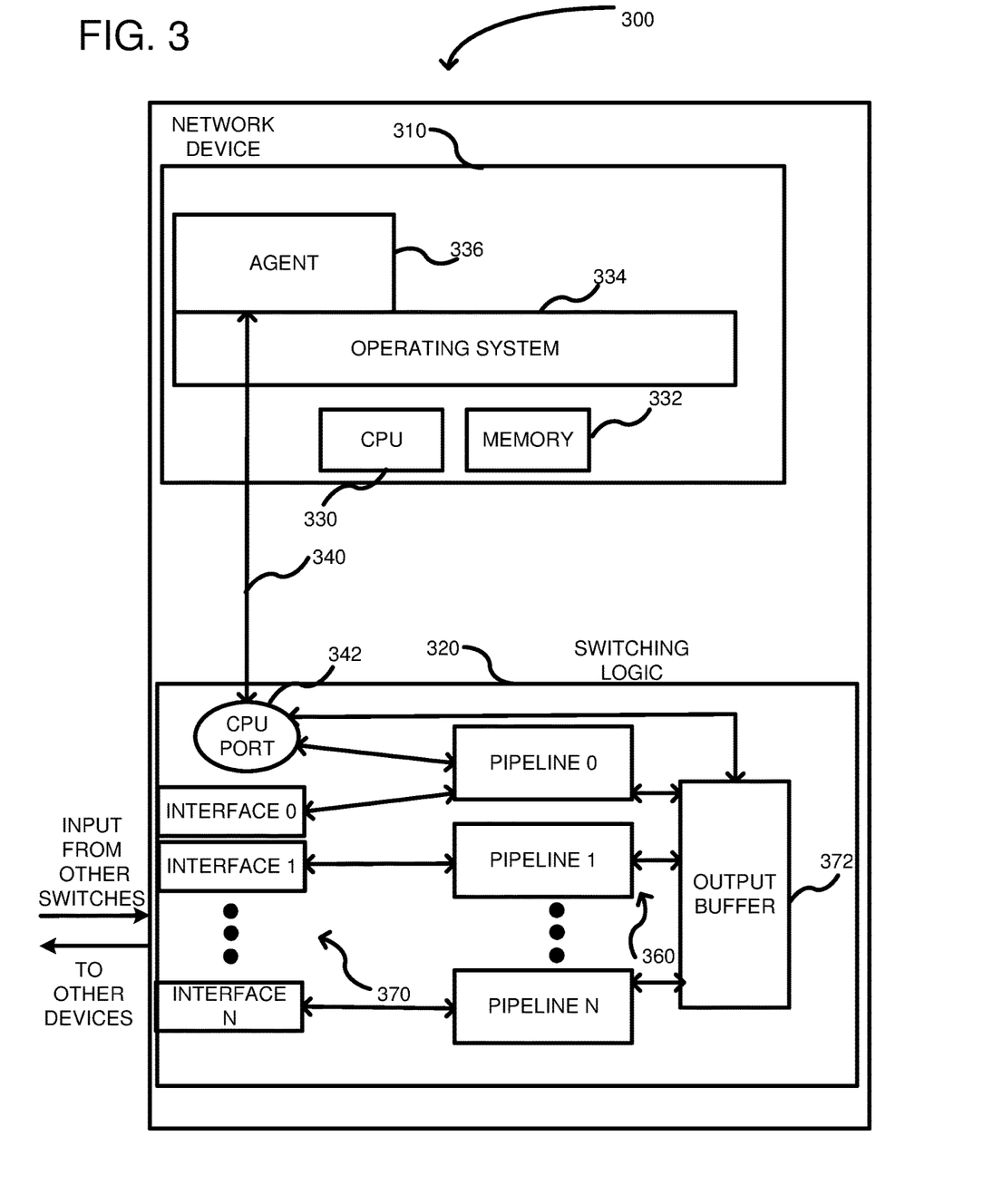
FIG. 3 is an example embodiment of a network device including multiple pipelines in parallel which are to be tested.

FIG. 3 shows an example network device 300. The network device 300 can be any switch for forwarding packet data including, but not limited to, a router, a switch, a load balancer, a firewall, etc. The network device 300 can be used as the routers in FIG. 1. The network device has a management portion 310 used for controlling one or more integrated circuits (ICs), such as IC 320, which is a switching portion of the network device. The management portion includes a central processing unit (CPU) 330 coupled to a memory 332. Although a CPU is shown, any desired controller can be used including a processor in an application-specific IC (ASIC) or any other type of processor. The memory 332 can be a variety of memories, but typically a Random Access Memory (RAM) is used (e.g., a Dynamic RAM or DRAM). The CPU 330 can execute an operating system 334, which, in turn, can run one or more applications, such as an agent 336. The agent 336 can be an executable process that controls testing of the network device 300. The management portion 310 can be coupled to the IC 320 through a bus 340 (PCIe or other protocols and bus types can be used) allowing the agent 336 to communicate with the IC through a CPU port 342, used for injecting probe network packets into the IC 320. The CPU port 342 is coupled to a pipeline 0, for injecting packets into pipeline 0. However, the CPU port 342 can have limited ability to inject packets into the other pipelines, shown generally at 360. The number of pipelines 360 can be any number from 0-N (where N is any integer value). The network device 300 can also receive network packets from external network devices on interfaces 370 and transmit the packets to other devices from an output buffer 372 coupled to the interfaces 370. The interfaces 370 have a one-to-one correspondence with the packet pipelines 360. Thus, a packet received on interface 1 is transmitted to pipeline 1, interface 2 to pipeline 2, and so on. The CPU port 342 is coupled to the output buffer 372 and can use the output buffer to transmit packets on any of the desired interfaces 370 via the pipelines 360. In this way, the agent 336 can test any of the pipelines by transmitting a packet on an interface corresponding to a pipeline with a header configured such that when the packet is reflected back from a neighbor on the same interface it is directed to the pipeline. Thus, for example, the agent 336 can inject a test packet through the CPU port to the output buffer 372 designated to be transmitted on the interface 1. When the test packet is transmitted, the neighbor device detects it is a test packet and reflects the test packet back to interface 1, as previously described in relation to FIG. 1. The test packet then passes through pipeline 1 coupled to interface 1 for testing the forwarding states of pipeline 1. The agent 336 can likewise test all of the pipelines 360 in a similar fashion.

Figure 4:
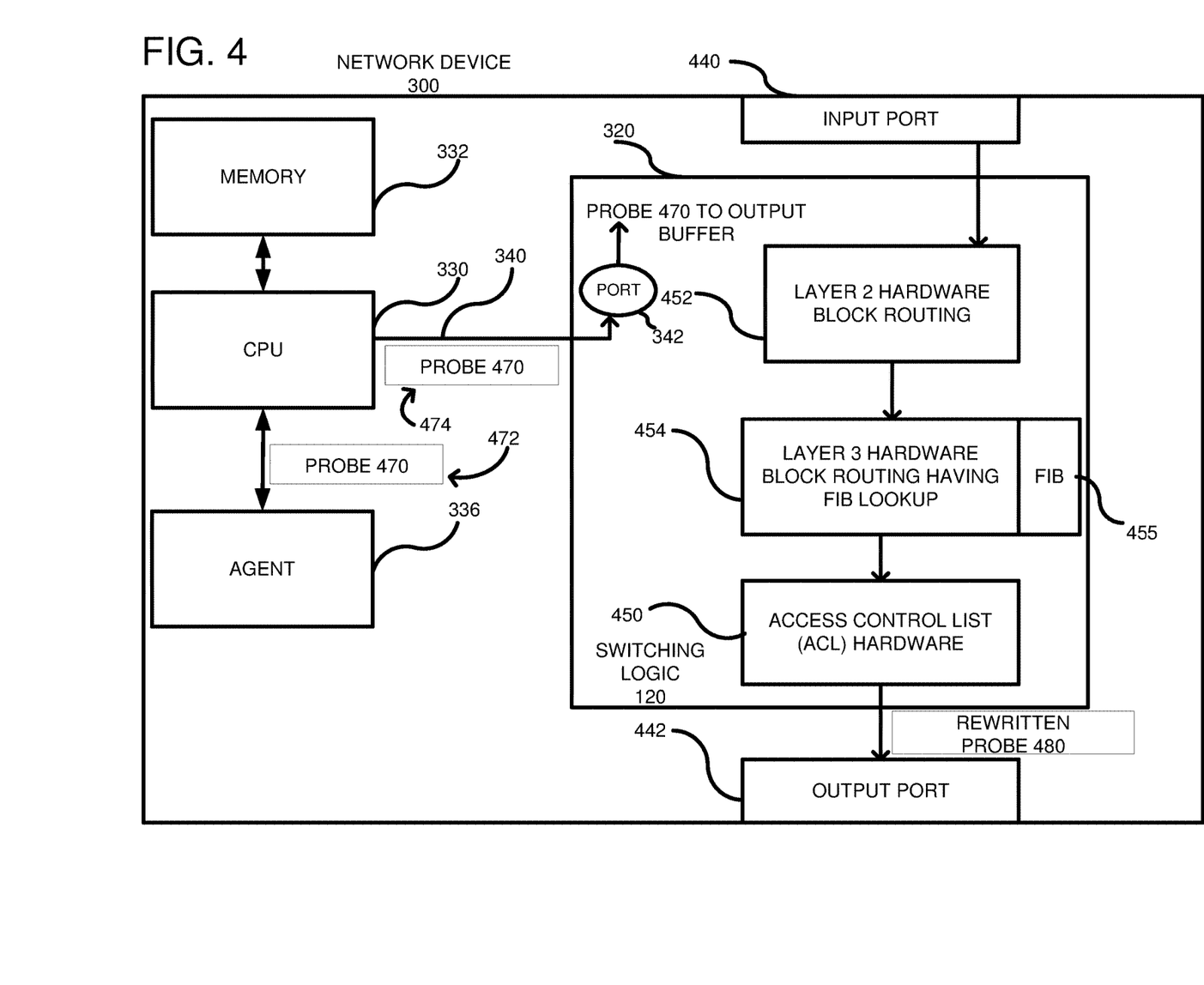
FIG. 4 is an example network device according to one embodiment wherein layer 2 and layer 3 lookups are performed.

FIG. 4 shows a detailed example of an embodiment of the network device 300 of FIG. 3. In this embodiment, the network device 300 is a switch that routes packets to a next hop in the network using a destination IP address. The CPU 330 is coupled to the memory 332 and to the switching logic 320 through the bus 340. The switching logic 320 is positioned between an input interface 440 and an output interface 442, which are typically adapted to receive network cables, such as Ethernet cables. The switching logic 320 can include multiple different hardware logic blocks including a Layer 2 hardware block 452, a Layer 3 hardware block 454, and an Access Control List (ACL) hardware block 450. A route lookup of the layer 3 hardware can include searching within a FIB 455, which includes destination addresses for packets being transmitted through the switching logic. The network device 300 can run routing protocols, such as an Open Shortest Path First (OSPF) or a Routing Information Protocol (RIP), to communicate with other Layer 3 switches or routers. The routing tables are used to lookup the route for an incoming packet. The ACL block 450 relates to permissions and can include rules whether to drop packets. The different hardware blocks can be coupled in series and additional hardware blocks can be added based on the design. Packets pass from the input port 440 to the output port in accordance with the configuration of the hardware logic blocks 450, 452, 454. Although only a single input and output port are shown, usually there are multiple ports on the switch.

As shown, the agent 336 can execute on the CPU 330 and can be used to control testing of one or more network devices using a probe 470. As shown at 472, the agent 336 passes the probe to the CPU hardware 330 for transmitting the probe to the switching logic 320 via the bus 340 (as shown at 474). The probe 470 passes through the CPU port 342 to the output buffer 372 (FIG. 3) for transmission to a neighbor network device on one of the interfaces 370 as selected by the agent 336. The probe 470 includes an appropriate destination MAC address that matches a MAC address of the network device 300 so that when the packet is reflected back, layer 3 switching occurs. Specifically, the probe includes a layer 2 header wherein the destination MAC address equals a MAC address of network device 300 and the source MAC is of the neighbor device 132 (FIG. 1). The layer 2 hardware 452 performs a lookup on the probe and modifies the layer 2 header so that the destination MAC equals a MAC address of network device 150 (FIG. 1) using layer 2 MAC tables (not shown). The probe packet 470 also includes a destination address that is an IP address (faux or real) within the Layer 3 lookup tables (the FIB 455). More particularly, the layer 3 hardware 454 performs a lookup on a prefix of the probe 470 and determines a proper output interface 442 that directs the probe packet 470 towards network device 150. Alternatively, the probe 470 can have the full IP destination address (which includes the prefix) for lookup in the layer 3 hardware 454. In either case, the agent 336 ensures that the probe 470 includes a destination address that is found in the FIB so as to test the forwarding states of the switching logic 320. The probe is rewritten, as shown at 480, to include a proper MAC address for the network device 150 and sent to an output interface 442 indicated by the layer 3 hardware 454.

Network devices 132, 150 can have a similar structure to the network device 300. The ACL 450 of each device can have comparison logic (not shown) for detecting when a packet is a test probe by matching on different fields in the packet header, such as the UDP field, the address field, and the TTL field. Any one or more of these fields can be used or other fields can be added. If a match a found, then the ACL hardware detected a test probe and can transmit the packet to the CPU 330 so as to determine if the packet should be reflected back (with or without modification) or analyzed to determine whether the packet is to be locally tested for passing or failing the test.

Figure 5:
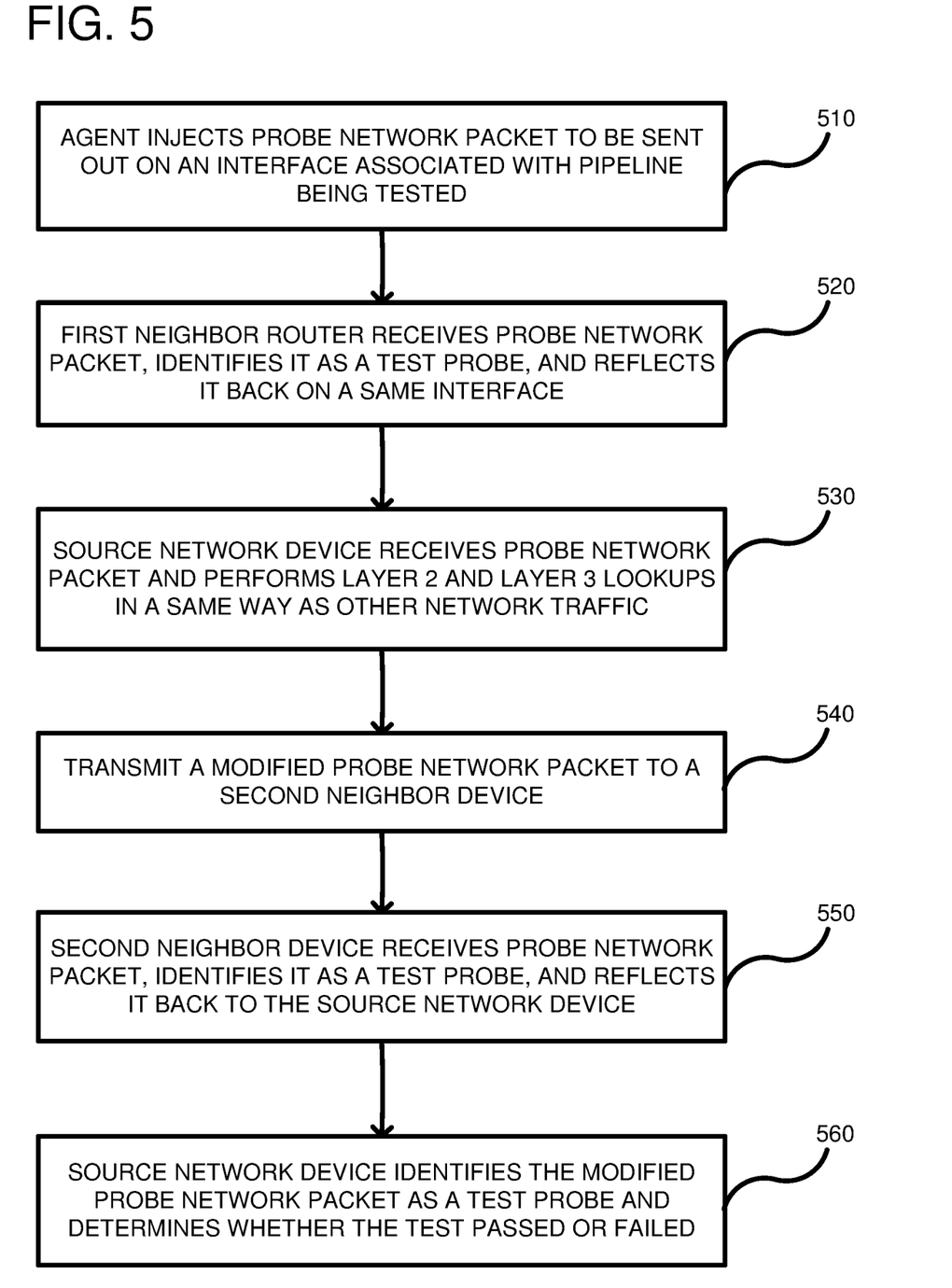
FIG. 5 is a flowchart according to one embodiment for testing of forwarding states of a network device using multiple neighbor network devices.

FIG. 5 is a flowchart according to one embodiment for testing a forwarding table in a network device. In process block 510, an agent can inject a probe network packet into an interface associated with a pipeline to be tested. For example, in FIG. 3, the agent 336 can transmit a probe network packet through the CPU port 342 to an output buffer 372 with a particular interface 370 designated. The interface designated is associated with the pipeline 360 being tested. In particular, whatever interface 370 the probe network packet is transmitted from is reflected back to the same interface causing the probe network packet to be switched by the pipeline coupled to the interface. Thus, if the agent wants to test a forwarding table in pipeline 2, it transmits the probe network packet out on interface 2. Additionally, the probe network packet has header information corresponding to the source network device 110 (FIG. 1) so that when the packet is received back, the source network device will properly exercise the designated pipeline. For example, the destination MAC address can be that of the source network device 110, despite that normal protocol would have the source MAC address being the source network device. The source MAC address can be, instead, a faux address. In process block 520, a first neighbor router receives the probe network packet, identifies it as a test probe and reflects the probe network packet back on the same interface. For example, turning to FIG. 4, when a neighbor device receives the probe network packet it determines that the destination MAC address is not that of the neighbor network device. As a result, the switching logic 320 bypasses layer 2 452 and layer 3 454. However, the packet does get processed by ACL hardware 450. For example, in FIG. 2, the ACL 252 detects the probe network packet is a test probe by comparing header information to known header information associated with test packets. If there is a match, the ACL 252 reflects the identical packet back on the same interface.

In process block 530, the source network device receives the probe network packet back from the neighbor device and performs layer 2 and layer 3 lookups on the probe network packet, just as if the packet is normal network traffic. For example, in FIG. 2, the packet is reflected back as shown by arrow 260 and the FIB 226 is tested. In particular, because the destination MAC properly designates the router A 210, it performs normal layer 2 and layer 3 switching. In this way, pipeline 1 224 is properly exercised. Additionally, because of the switching within the pipeline, the probe network packet is modified. For example, the destination MAC address is modified to indicate the MAC address of the neighbor router, which is the second neighbor device 270 (FIG. 2).

In process block 540, the modified probe network packet is transmitted to the second neighbor device. As a result, of the modification, when the probe network packet is received by the second neighbor device 150, it appears as it is normal network traffic. Consequently, in process block 550, the second neighbor device performs layer 2 and layer 3 lookups. However, the packet is also identified as a test packet by the ACL hardware (FIG. 4 at 450). Consequently, the packet is reflected back to the source network device in an unmodified form. In process block 560, the source network device detects that the packet is a test packet in its ACL hardware. As a result, the ACL hardware can pass the probe network packet to the agent (e.g., agent 214, FIG. 2) for analysis. The agent can analyze a variety of different parameters, such as what interface the packet was received back upon, the source and destination MAC addresses, and the TTL to determine that the packet passed or failed the test. For example, if the FIB 226 (FIG. 2) has an improper entry, the packet could be routed to a different neighbor router, which would later be detected as the probe network packet having an improper MAC address.

Figure 6:
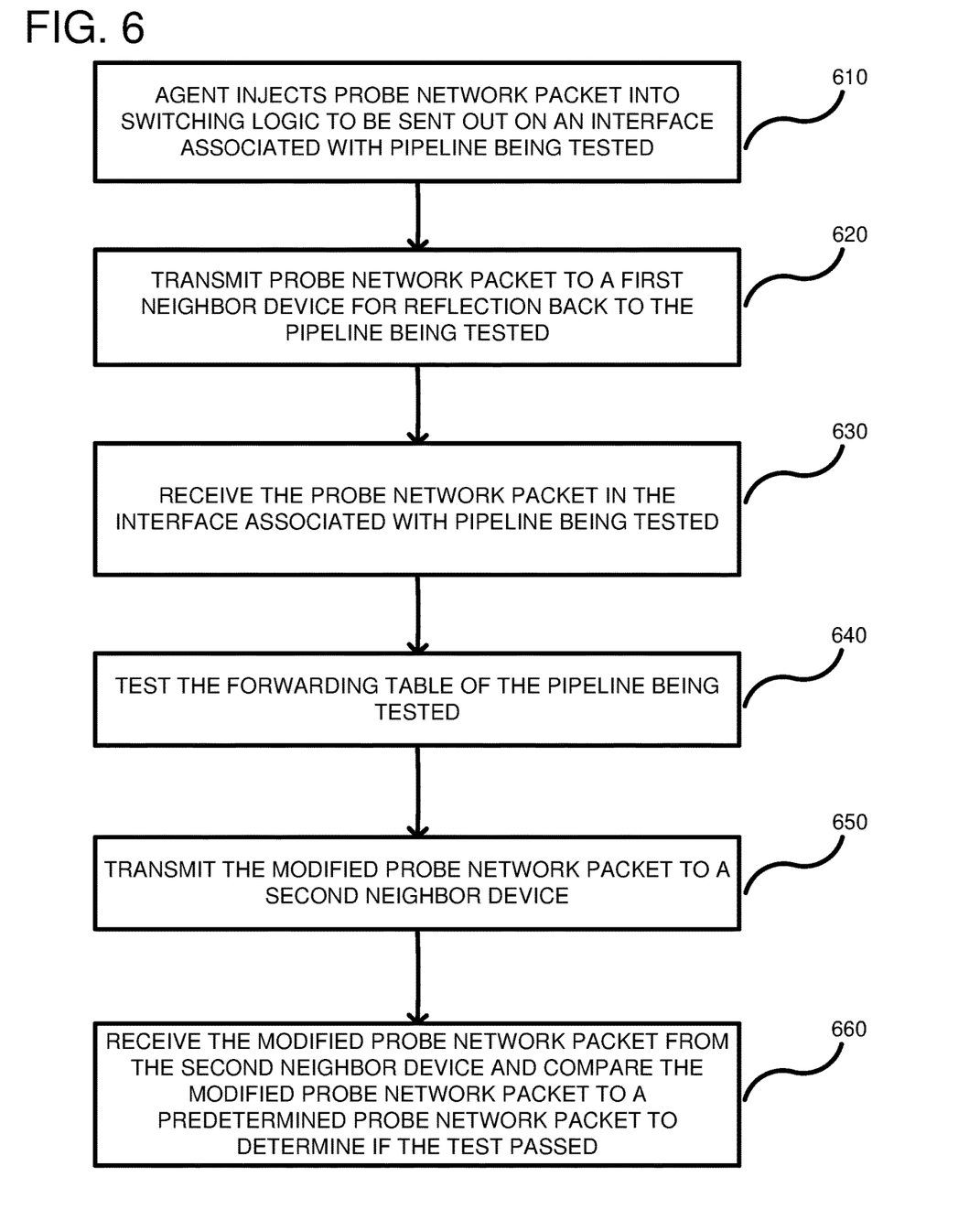
FIG. 6 is a flowchart according to another embodiment for testing of forwarding states of a network device using multiple neighbor network devices.

FIG. 6 is a flowchart according to another embodiment for testing a forwarding table. In process block 610, an agent injects a probe network packet into an interface associated with a pipeline to be tested. For example, in FIG. 3, the agent 336 can inject a probe network packet into switching logic 320 using the CPU port 342 and the output buffer 372. The interface 370 is associated with the pipeline being tested in that it is coupled to the pipeline for incoming packets. In process block 620, the probe network packet can be transmitted to a first neighbor device for reflection back. For example, in FIG. 1, the first neighbor device 132 reflects the probe network packet back to the same interface 134 of the source network device 110. In process block 630, the probe network packet is received in the interface associated with the pipeline being tested. The interface is the same interface upon which the packet was transmitted to the neighbor device. For example, FIG. 1 shows the interface 134 is used to transmit and receive the probe network packet. In process block 640, the forwarding table of the pipeline is tested by performing normal layer 2 and layer 3 switching, as would be performed on other network traffic. For example, in FIG. 4, the layer 2 452 and layer 3 454 hardware can perform lookups, including the lookup in the FIB 455. As a result of these lookups, the probe network packet has header information modified, including the TTL and the MAC addresses. In process block 650, the modified probe network packet is transmitted to a second neighbor device, such as neighbor device 150 of FIG. 1. The second neighbor device is selected based on the FIB lookup that was performed. Finally, in process block 660, the modified probe network packet is received back from the second neighbor device and can be compared to an expected packet. For example, an ACL in the source network device can pass the packet to an agent 336 (FIG. 3), which can compare the probe network packet to a stored packet in memory 332. If there is a match then the test passed and if there is no match, then the test failed. The agent can perform the test for all pipelines 360 and all forwarding entries in the forwarding tables.

Figure 7:
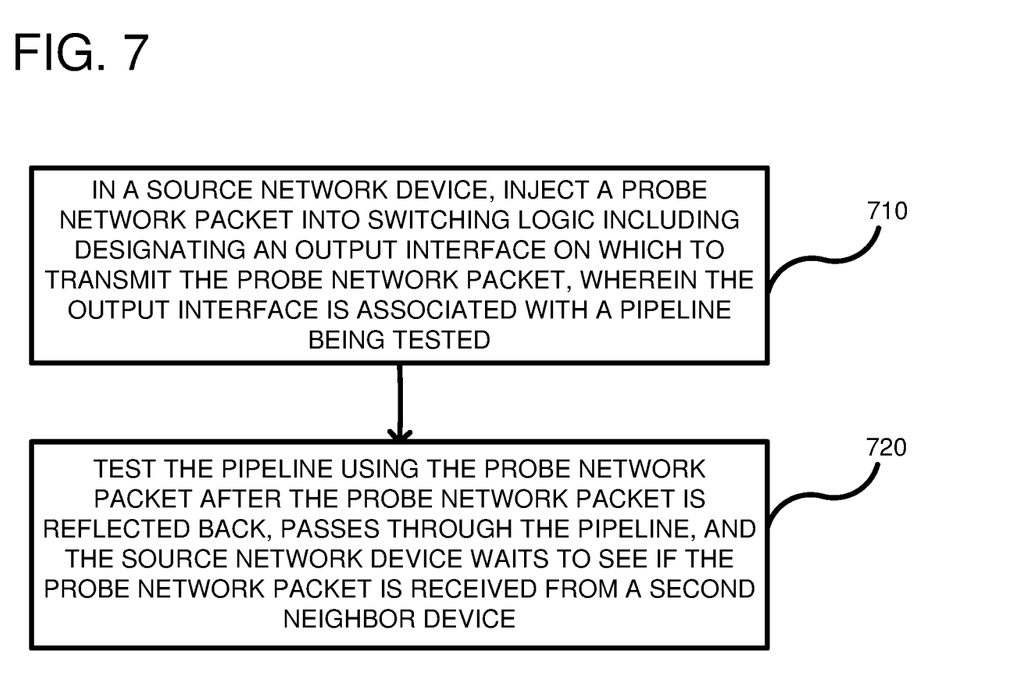
FIG. 7 is a flowchart according to yet another embodiment for testing of forwarding states of a network device using multiple neighbor network devices.

FIG. 7 is a flowchart of a method according to another embodiment. In process block 710, a source network device injects a probe network packet into switching logic including designating an output interface upon which to transmit the probe network packet. The output interface is associated with the pipeline being tested. For example, in FIG. 4, the agent 336 injects the probe 470 into the switching logic 320 using port 342. As shown in FIG. 3, the probe can be passed to the output buffer 372 and to an interface 370 for transmission to a neighbor device. It should be noted that while the testing is occurring, the source network device can continue to actively switch other network traffic. The probe network packet can include a faux destination address selected by the agent so as to test the desired entry in the FIB. The neighbor device does not perform a layer 2 and layer 3 lookup due to the improper MAC address. In process block 720, the probe network packet is reflected back so as to test the pipeline. FIG. 1 shows that the probe network packet passes through the pipeline being tested 140, which performs layer 2 and layer 3 lookups. As a result of the lookups, the probe network packet can be transmitted to a second neighbor device before being reflected back to the source network device. Thus, as shown in FIG. 1, the probe network packet traverses three hops in performing the test so as to provide a simulation of real network traffic. In some cases, the probe network device switches incorrectly in the pipeline being tested and the probe network packet is not received back by the source network device. In such a case, the source network device can retry transmission of the probe network packet. If the source network device continues to fail receiving the probe network packet back from the second neighbor device, then the test can be deemed failed.

Figure 8:
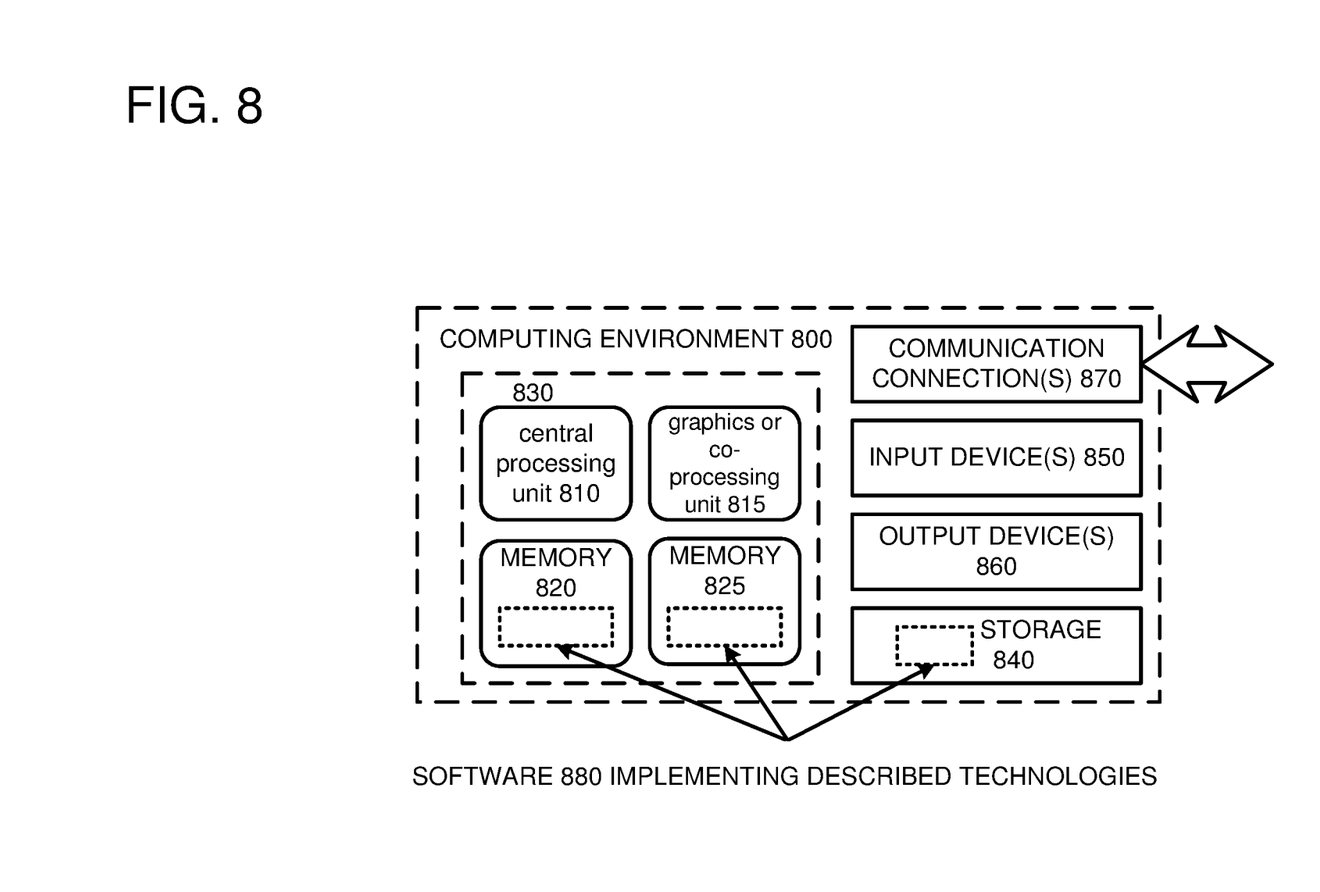
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, any part of the computing environment 800 can be used in the network devices described herein.

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of testing a forwarding table in a source network switch, the method comprising:

using an agent in the source network switch, performing a test of the forwarding table by injecting a probe network packet into switching logic of the source network switch, wherein the switching logic includes multiple pipelines for handling network packets, the agent designating an interface associated with a selected pipeline of the switching logic to be tested;

transmitting the probe network packet to a first neighbor switch from the interface, the probe network packet having header information therein indicating that the probe network packet is a test packet to be reflected from the first neighbor switch back to the source network switch with the probe network packet unchanged, including a time-to-live parameter in the probe network packet left unchanged;

receiving the probe network packet in the interface associated with the selected pipeline from the first neighbor switch;

testing the forwarding table of the selected pipeline in the source network switch using the probe network packet, wherein the forwarding table modifies the probe network packet, and wherein the time-to-live parameter is modified;

transmitting the modified probe network packet to a second neighbor switch, wherein the header information indicates to reflect the modified probe network packet back to the source switch with the modified time-to-live parameter in the modified probe network packet left unchanged; and receiving the modified probe network packet from the second neighbor switch and comparing the modified probe network packet to a predetermined probe network packet so as to determine if the test passed.

2. The method of claim 1, wherein the receiving the modified probe network packet from the second neighbor switch further includes comparing the header of the modified probe network packet to identify the modified probe network packet as a test packet and transmitting the modified probe network packet to the agent.

3. The method of claim 1, wherein the header information indicating that the probe network packet is a test packet includes a source IP address within a particular address range and a User Datagram Protocol (UDP) port number.

4. The method of claim 1, wherein testing the forwarding table of the selected pipeline includes a layer 2 lookup and a layer 3 lookup on the probe network packet.

5. The method of claim 1, wherein the source network switch continues to route network packets while performing the test.

6. A method, comprising:
  injecting a probe network packet, including a time-to-live (TTL) parameter set to a predetermined value, onto an output interface in a source network switch, the injecting including designating the output interface on which to transmit the probe network packet, wherein the output interface is associated with a pipeline within the source network switch to be tested; and
  testing a forwarding table of the pipeline using the probe network packet after the probe network packet is reflected back from a first neighbor network switch, wherein the reflected back packet includes the TTL parameter remaining at the predetermined value so that the TTL parameter was unmodified by the first neighbor network switch, and passes through the pipeline where the TTL parameter is reduced so that the TTL parameter has a modified value generated by the source network switch, wherein the testing comprises waiting for the packet to be reflected back to the source network switch from a second neighbor switch;
  receiving the probe network packet from the second neighbor switch with the TTL parameter at the modified value generated by the source network switch without the TTL parameter being further modified by the second neighbor switch so as to test the forwarding table of the pipeline of the source network switch, wherein the probe network packet from the second neighbor switch is compared to a predetermined probe network packet to determine if the test passed.

7. The method of claim 6, wherein the source network switch actively switches network traffic while performing the testing of the pipeline.

8. The method of claim 6, further including transmitting the probe network packet to the second neighbor switch after the probe network packet passes through the pipeline.

9. The method of claim 6, wherein the probe network packet includes the TTL parameter which is used, in part, to identify the probe network packet as a test packet.

10. The method of claim 6, wherein testing the pipeline includes testing a forwarding table within the pipeline including performing a layer 2 lookup and a layer 3 lookup on the probe network packet.

11. The method of claim 6, wherein the probe network packet includes a faux destination address to test the pipeline.

12. The method of claim 6, further including switching logic including multiple pipelines, and wherein an agent executing on the source network switch designates different output interfaces to test the multiple pipelines.

13. The method of claim 6, wherein the probe network packet is identified as a test packet by using header information including a source IP address within a given address range and a User Datagram Protocol (UDP) port number.

14. The method of claim 6, wherein the first neighbor network switch does not perform a layer 3 lookup on the probe packet, but the second neighbor network switch performs the layer 3 lookup on the probe network packet.

15. One or more computer-readable media, which are non-transitory, comprising computer-executable instructions that, when executed, cause a computing system to perform a method comprising:
  using an agent in the source network switch, performing a test of the forwarding table by injecting a probe network packet into switching logic of the source network switch, wherein the switching logic includes multiple pipelines for handling network packets, the agent designating an interface associated with a selected pipeline of the switching logic to be tested;
  transmitting the probe network packet to a first neighbor switch from the interface, the probe network packet having header information therein indicating that the probe network packet is a test packet to be reflected from the first neighbor switch back to the source network switch with the probe network packet unchanged, including a time-to-live parameter in the probe network packet left unchanged;
  receiving the probe network packet in the interface associated with the selected pipeline from the first neighbor switch;
  testing the forwarding table of the selected pipeline in the source network switch using the probe network packet, wherein the forwarding table modifies the probe network packet, and wherein the time-to-live parameter is modified;
  transmitting the modified probe network packet to a second neighbor switch, wherein the header information indicates to reflect the modified probe network packet back to the source switch with the modified time-to-live parameter in the modified probe network packet left unchanged; and
  receiving the modified probe network packet from the second neighbor switch and comparing the modified probe network packet to a predetermined probe network packet so as to determine if the test passed.

16. The one or more computer-readable media of claim 15, wherein the receiving the modified probe network packet from the second neighbor switch further includes comparing the header of the modified probe network packet to identify the modified probe network packet as a test packet and transmitting the modified probe network packet to the agent.

17. The one or more computer-readable media of claim 15, wherein the header information indicating that the probe network packet is a test packet includes a source IP address within a particular address range and a User Datagram Protocol (UDP) port number.

18. The one or more computer-readable media of claim 15, wherein testing the forwarding table of the selected pipeline includes a layer 2 lookup and a layer 3 lookup on the probe network packet.

19. The one or more computer-readable media of claim 15, wherein the source network switch continues to route network packets while performing the test.

* * * * *